H. H. MARKER.
CLUTCH.
APPLICATION FILED DEC. 8, 1913.

1,136,025.

Patented Apr. 20, 1915.

Witnesses
E. R. Bartlett.
O. M. Dorr.

Inventor
Henry H. Marker

By
Attorneys

UNITED STATES PATENT OFFICE.

HENRY H. MARKER, OF MOUNT CLEMENS, MICHIGAN, ASSIGNOR OF THREE-FOURTHS TO FRANK G. KRUEGER, MARVIN A. SMITH, AND RALPH S. MOORE, ALL OF DETROIT, MICHIGAN.

CLUTCH.

1,136,025.  Specification of Letters Patent.  Patented Apr. 20, 1915.

Application filed December 8, 1913. Serial No. 805,236.

*To all whom it may concern:*

Be it known that I, HENRY H. MARKER, a citizen of the United States of America, residing at Mount Clemens, in the county of Macomb and State of Michigan, have invented certain new and useful Improvements in Clutches, of which the following is a specification, reference being had therein to the accompanying drawings.

This invention relates to clutches particularly adapted for use in motor vehicle constructions for connecting the motor and power transmitting mechanism, and its object is to provide a cone clutch with supplemental means whereby motion will be imparted to the driven member before the cone clutch becomes operative to give a gradual even engagement and a positive drive when engaged.

A further object is to provide a simple compact construction having certain other new and useful features all as hereinafter more fully described.

With these and other ends in view the invention consists in an arrangement of cone clutch and friction member with lever mechanism whereby the friction member is first brought into operative position and then the cone member engaged, said members alternately serving as fulcrums for the levers.

The invention also consists in the construction and arrangement of parts whereby a simple and compact device is secured having other new and useful features, all as hereinafter more fully described, reference being had to the accompanying drawings, in which—

Figure 1:
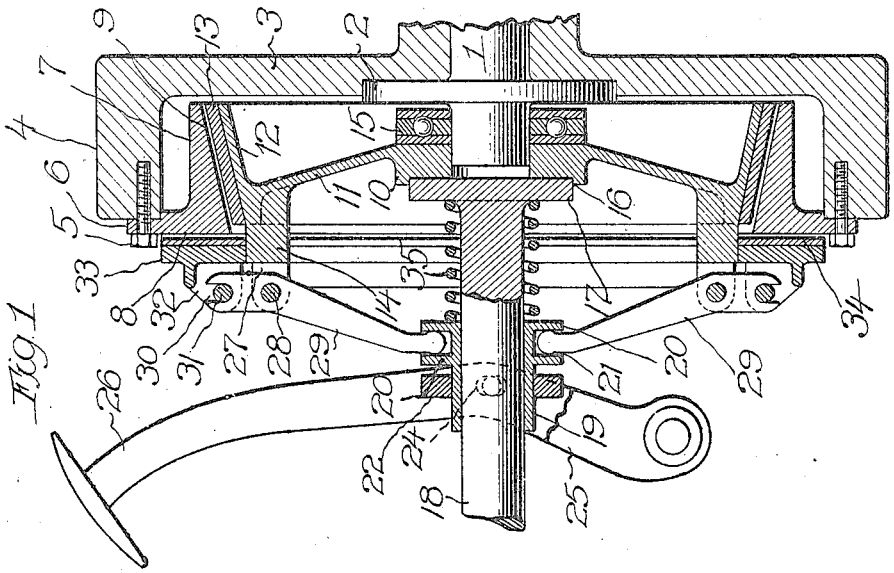
Figure 2:
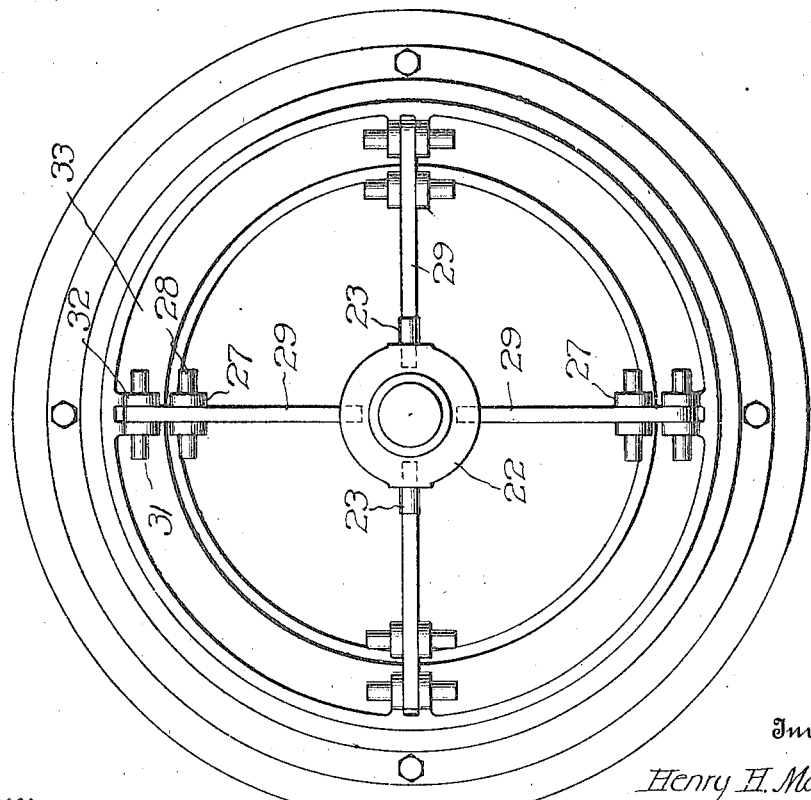

Figure 1 is a longitudinal sectional view of a clutch embodying this invention, and Fig. 2 is an end view of the same.

In describing my invention by means of the drawings above referred to I desire to point out that I intend said views as merely illustrative of an example whereby my invention may be applied in practice, and I do not limit my claims to the arrangement and construction of parts indicated. The following description is therefore to be construed broadly as including the mechanical arrangements and constructions which come within the spirit of this invention.

In the drawings 1 denotes a driving element in the form of a shaft which is preferably formed with a flange 2 adjacent to the end thereof and mounted upon the shaft 1 and embracing the flange 2 is the hub and web of a fly or balance wheel 3 having an offset rim 4, the flange providing o convenient place of attachment for bolting or otherwise rigidly securing the wheel to the shaft. Rigidly secured in any suitable manner to one side of the rim 4, as by screw bolts 5, is the peripheral flange 6 of an annular clutch member 7 which extends inwardly beneath the overhanging rim of the fly wheel into the chamber formed thereby and said member 7 is formed with an annular friction surface 8 on its outer vertical face and an angularly disposed friction surface on its inner annular face 9 which is preferably disposed at an obtuse angle relatively to the face 8 and extended the full width of the clutch member which projects to approximately the full depth of the fly wheel chamber.

Slidably mounted and free to turn upon the projecting end of the shaft 1 is the hub portion 10 of a clutch wheel or member 11 having a rim 12 provided with an angularly disposed face confronting the face 9 of the member 7, said wheel forming a cone to frictionally engage the opposing cup formed by said member. The surface of the cone is covered with a lining 13 of fiber or other suitable material forming a friction surface, and when the cone member is moved, the lining 13 is brought into frictional engagement with the contact face 9 of the cup member 7.

Sleeved upon the projecting end of the shaft 1, between its flange 2 and the adjacent end of the hub of the cone member, is a conventional form of anti-friction end thrust collar 15, which together with the said hub is free to move longitudinally of the shaft 1. A driven element or shaft 18 is in axial alinement with the shaft 1 and the end of the hub 10 of the cone which projects beyond the end of the driven shaft is rigidly secured to the adjacent end of the driven shaft 18 by any suitable means such as a flange 17 on the shaft secured within a seat 16 formed on the end of the hub.

Splined, keyed or otherwise mounted upon the driven shaft 18 to slide longitudinally thereon and at the same time rotate with said shaft, is a sleeve 19 having an end thereof provided with flanges 20 forming an annular groove 21, the purpose of which will presently appear. Loosely mounted upon the sleeve 19 against the outer flange 20 thereof is a ring 22 having diametrically opposed studs 23 extending into slots 24 provided therefor in the yoke 25 of an operating lever 26, illustrating a conventional form of pedal for shifting the operating sleeve 19 to throw out the clutch.

A plurality of lugs 14 project outwardly from the rear edge of the rim 12 of the cone member and projecting outwardly from the end of each of said lugs is a pair of apertured ears 27 between which is fulcrumed a lever 29 upon a pin 28. The inner ends of the long arms of the levers engage the annular groove 21 of the sleeve 19 and the outer ends of the short arms of said levers are bifurcated or slotted, as at 30, to engage transversely arranged pins 31 carried by pairs of ears or lugs 32 on an annular clutch ring or member 33 slidably mounted upon the outwardly projecting lugs 14 of the cone wheel 7 and supported thereby with its plane side which is covered with a lining 34 of fiber or other suitable material adjacent to and confronting the friction surface 8 of the cup member 7.

Encircling the driven shaft 18, between the flange 17 and the inner end of the sleeve 19, is a coiled compression spring 35, acting to move said sleeve longitudinally upon the shaft away from the cone wheel and rock the levers 29 upon their pivots 28. The first rocking movement of said levers forces the friction ring 33 into frictional contact with the face 8 of the clutch member carried by the fly wheel, the cone wheel 11 serving as a support for the lever fulcrum. After the ring 33 has been brought into contact with the surface 8, further movement of the levers caused by the action of the spring on the sleeve 19, will draw the cone into frictional engagement with the surface 9 of the member 7 owing to the fact that as soon as the ring 33 is fully seated on the surface 8 it becomes the support for the levers, their pivots 31 then becoming their fulcrums so that the levers turning thereon will act through the pivots 28 to move the cone with its driven shaft 18 longitudinally, said shaft being so mounted as to be free to move a limited distance.

The disengagement of the clutch members to stop the transmission of motion from the driving to the driven shafts is accomplished by pressing forwardly on the pedal 25 against the action of the spring 35. This force will move the driven shaft 18 with its cone member 11 until the hub of said cone abuts the thrust collar 15, when a further movement of the sleeve will swing the levers 29 upon their pivots 28 as fulcrums and move the friction ring 33 out of contact with the surface 8. The spring 35 thus acts to normally hold the friction surfaces engaged and the clutch operative to transmit motion from the driving to the driven shaft.

By providing the auxiliary clutch or friction ring 33 and operating the same as described, motion is transmitted to the driven member before the main or cone clutch becomes effective, and thus the sudden jerks and strains incident to the sudden application of power to the driven shaft in automobile constructions are obviated, and the construction of said auxiliary clutch is such that it will slip when brought into frictional contact with its driver and thus gradually apply the power. The main and auxiliary clutches are so combined and arranged that when both are engaged, slippage is prevented due to the peculiar manner in which the cone is gripped between them and a very simple and compact construction secured. By pivotally supporting the levers 29 near the periphery of the cone, levers having comparatively long arms are employed thus increasing the leverage and obviating the necessity for a very strong coiled spring to hold the clutch engaged and the pivotal connections of the levers to the clutch members is such that the friction ring is first brought into contact with its driver and then serves as a fulcrum for the levers to turn thereon and bring the cone into frictional contact with its cup, the clutch members thus alternately serving as fulcrums for one another and operating, one in advance of the other.

Having thus fully described my invention what I claim is.

1. In a clutch, a driving element, a main clutch member adapted to engage said driving element, an auxiliary clutch member slidable upon said main clutch member and adapted to engage said driving element, and means pivotally connected to and supported by said members for moving the same into contact with the driving element whereby said members alternately serve as fulcrums for said means to move the auxiliary clutch mechanism in advance of the main clutch member.

2. The combination with a movable main clutch member and a driving member, of an auxiliary clutch member adapted to engage said driving member, and means connecting and pivotally attached to said main and auxiliary members for moving the same into contact with the driving member and adapted to first move the auxiliary member into contact with the driving member, said auxiliary member then serving as a fulcrum for said means in moving the main member into contact with the driving member.

3. In a clutch, the combination with a cone member and a cup member, one of which members is fixed and the other movable into contact therewith, of an auxiliary member carried by the movable clutch member to engage the fixed member, and actuating means adapted to alternately use said members as fulcrums for moving one member in advance of the other.

4. The combination with a cone clutch having relatively fixed and movable clutch members, of an auxiliary clutch member mounted upon said movable clutch member to move longitudinally thereon into contact with the fixed member, and actuating levers carried by said movable clutch member and pivotally attached thereto and to the auxiliary clutch member for first bringing said auxiliary clutch member into action by turning the levers upon the movable member and then bringing the movable member into action by turning the levers upon the auxiliary member.

5. In a clutch, a member having an internal conical contact surface and an annular end face, a cone member adapted to engage the conical face of said member, an annular auxiliary member shiftable upon said cone member into contact with said end face of the first mentioned member, and means adapted to shift said auxiliary member in advance of said cone member.

6. In a clutch, driving and driven elements, a clutch member carried by said driving element, a second clutch member on the driven element adapted to engage the first mentioned member, an auxiliary clutch member movable longitudinally upon said second named clutch member and adapted to engage the first named clutch member, fulcrumed arms carried by said second named member and having the outer ends thereof loosely connected with said auxiliary clutch member, and means for turning said arms upon their connections with each of said members.

7. In a clutch, a driving cup member, a driven cone member movable into and out of contact with said cup member, an auxiliary member movable upon said cone member into and out of contact with said cup member, levers pivotally attached intermediate their ends to the cone member and near their ends to said auxiliary member to actuate said members in opposite directions into engagement with said driving cup member, and means for simultaneously turning said levers and their pivots.

8. In a clutch, driving and driven elements, a cup member carried by said driving element, a cone member movable into engagement with said cup member, an auxiliary member slidable longitudinally of and rotatable with said cone member and adapted to engage said cup member, levers fulcrumed upon said cone member and connected to said auxiliary member to move said member in advance of said cone member, and spring pressed means acting upon said levers to hold said cone and auxiliary members normally in engagement with said cup member.

9. In a clutch, driving and driven elements, a driving clutch member carried by said driving element, a main clutch member movable longitudinally of said driving clutch member, an auxiliary clutch member movable longitudinally of said main clutch member and confronting an end of said driving clutch member, and actuating means radiating from said driven element and having connection with said main and auxiliary clutch members and means for moving said actuating means whereby said auxiliary member serves as a fulcrum for shifting said main clutch member.

10. In a clutch, the combination of a driving shaft and a driven shaft arranged in axial alinement, a cup member carried by said driving shaft having an internal friction face and an end face, a cone member on the driven shaft movable longitudinally into engagement with the cup, an auxiliary clutch member slidably mounted upon the cone member and confronting an end face of said cup, levers pivotally attached intermediate their ends to the cone and pivotally connected to the auxiliary member at their ends, means slidably mounted on the driven shaft for engaging and operating said levers, and means for moving said slidable means.

11. In a clutch, the combination of driving and driven elements, a cup member secured to said driving element, and having an internal conical friction surface and a plane surface, a cone member on the driven element having a conical friction surface to engage the internal surface of the cup and bearing portions extending beyond the end surface of the cup, an annular auxiliary member mounted upon said bearing portions and confronting the end face of the cup, levers fulcrumed upon said bearing portions and pivotally connected to said auxiliary member with their ends extending radially toward the driven element, and means slidable on the driven element in engagement with said levers whereby said levers are shifted to move said clutch members in opposite directions into engagement with said cup member.

12. In a clutch, the combination of a driving shaft, a driven shaft in axial alinement with the driving shaft, a fly wheel on the driving shaft having an overhanging rim forming a chamber in one side, an annular cup member secured within said chamber and having a conical bore with the end of the bore of greatest diameter at the inner end of the chamber, said bore forming an internal friction surface, said cup member being also formed with a plane outer end surface, a wheel on the driven shaft having a conical surface forming a cone to engage the cup member, lugs on said wheel near its periphery projecting through the cup member adjacent to said end surface, an annular member having a surface opposing said end surface and slidably mounted upon said lugs, a series of radial levers pivotally attached intermediate their ends to said wheel and at the outer ends to said annular member, a sleeve member on the driven shaft engaging said levers to move the same, and a spring on the driven shaft to move the sleeve in one direction and actuate the levers.

In testimony whereof I affix my signature in presence of two witnesses.

HENRY H. MARKER.

Witnesses:
 ANNA M. DORR,
 C. R. STICKNEY.